(12) United States Patent
Katz et al.

(10) Patent No.: US 11,238,074 B2
(45) Date of Patent: Feb. 1, 2022

(54) EFFICIENT GRAMMATICAL PROPERTY ALIGNMENT FOR A QUESTION ANSWERING SYSTEM

(71) Applicant: INTERNATIONAL BUSINESS MACHINES CORPORATION, Armonk, NY (US)

(72) Inventors: Edward G. Katz, Washington, DC (US); Stephen A. Boxwell, Franklin, OH (US); Kristen M. Summers, Takoma Park, MD (US); Charles E. Beller, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 16/657,999

(22) Filed: Oct. 18, 2019

(65) Prior Publication Data

US 2021/0117456 A1 Apr. 22, 2021

(51) Int. Cl.
*G06F 16/332* (2019.01)
*G06F 40/205* (2020.01)
*G06F 40/253* (2020.01)
*G06F 40/284* (2020.01)

(52) U.S. Cl.
CPC ........ *G06F 16/3329* (2019.01); *G06F 40/205* (2020.01); *G06F 40/253* (2020.01); *G06F 40/284* (2020.01)

(58) Field of Classification Search
CPC .. G06F 16/3329; G06F 40/253; G06F 40/284; G06F 40/20
See application file for complete search history.

(56) References Cited

U.S. PATENT DOCUMENTS

| | | | |
|---|---|---|---|
| 10,223,646 B1 * | 3/2019 | Vontobel | G06Q 10/063112 |
| 10,248,689 B2 | 4/2019 | Brrennan et al. | |
| 2008/0040114 A1 * | 2/2008 | Zhou | G06F 16/3329 704/257 |
| 2016/0179939 A1 * | 6/2016 | Levas | G06F 16/3329 707/728 |
| 2016/0314114 A1 | 10/2016 | Barbetta et al. | |
| 2017/0193088 A1 * | 7/2017 | Boguraev | G06F 40/284 |
| 2017/0242915 A1 * | 8/2017 | Torisawa | G06F 16/00 |
| 2018/0046937 A1 | 2/2018 | Corville et al. | |

OTHER PUBLICATIONS

Severyn et al., Structural Relationships for Large-Scale Learmomg of Answer Re-Ranking, SIGIR'12, Aug. 12-16, 2012, whole document (Year: 2012).*

(Continued)

*Primary Examiner* — Sonia L Gay
(74) *Attorney, Agent, or Firm* — Stephanie L. Carusillo

(57) ABSTRACT

A service, in response to receiving a question in a natural language format, identifies one or more selected passages from a corpus that are relevant to a focus of the question from among multiple passages in the corpus. The service aligns one or more answer grammatical properties of one or more answers, selected from the one or more selected passages, to one or more question grammatical properties of the focus of the question. The service returns the one or more answers in response to the question.

20 Claims, 5 Drawing Sheets

(56) References Cited

OTHER PUBLICATIONS

Svetlana Stenchikova et al., Question Answering Using Semantic Roles for Speech Interface, Interspeech 2006—ICSLP, Researchgate, 5 pages.
Wikibooks, "Linguistics/Morphology", accessed online from <https://en.wikibooks.org/wiki/Linguistics/Morphology> as of Jul. 9, 2019, 5 pages.
No author, "Stemming and lemmatization", accessed online from <https://nlp.stanford.edu/IR-book/html/htmledition/stemming-and-lemmatization-1.html> as of Aug. 28, 2019, 3 pages.
Ng et al., "The CoNLL—2014 Shared Task on Grammatical Error Correction", Proceedings of the Eighteenth Conference on Computational Natural Language Learning: Shared Task, Baltimore, Maryland, Jul. 26-27, 2014, © 2014 Association for Computational Linguistics, 14 pages.

\* cited by examiner

EFFICIENT GRAMMATICAL PROPERTY ALIGNMENT FOR A QUESTION ANSWERING SYSTEM

BACKGROUND

1. Technical Field

One or more embodiments of the invention relate generally to data processing and particularly to efficient grammatical property alignment for a question answering system.

2. Description of the Related Art

Natural language processing (NLP) refers to a technique that supports applications that facilitate human interaction in natural language with machines. For example, one branch of NLP pertains to answering questions about a subject matter based on information available about the subject matter from a large corpus, or collection of data, such as text, stored electronically.

BRIEF SUMMARY

In one embodiment, a method is directed to, in response to receiving a question in a natural language format, identifying, by a computer, one or more selected passages from a corpus that are relevant to a focus of the question from among a plurality of passages in the corpus. The method is directed to aligning, by the computer, one or more answer grammatical properties of one or more answers, selected from the one or more selected passages, to one or more question grammatical properties of the focus of the question. The method is directed to returning, by the computer, the one or more answers in response to the question.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions, in response to receiving a question in a natural language format, to identify one or more selected passages from a corpus that are relevant to a focus of the question from among a plurality of passages in the corpus. The stored program instructions comprise program instructions to align one or more answer grammatical properties of one or more answers, selected from the one or more selected passages, to one or more question grammatical properties of the focus of the question. The stored program instructions comprise program instructions to return the one or more answers in response to the question.

In another embodiment, a computer program product comprises a computer readable storage medium having program instructions embodied therewith, wherein the computer readable storage medium is not a transitory signal per se. The program instructions executable by a computer to cause the computer to, in response to receiving a question in a natural language format, identify, by a computer, one or more selected passages from a corpus that are relevant to a focus of the question from among a plurality of passages in the corpus. The program instructions executable by a computer to cause the computer to align, by the computer, one or more answer grammatical properties of one or more answers, selected from the one or more selected passages, to one or more question grammatical properties of the focus of the question. The program instructions executable by a computer to cause the computer to return, by the computer, the one or more answers in response to the question.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
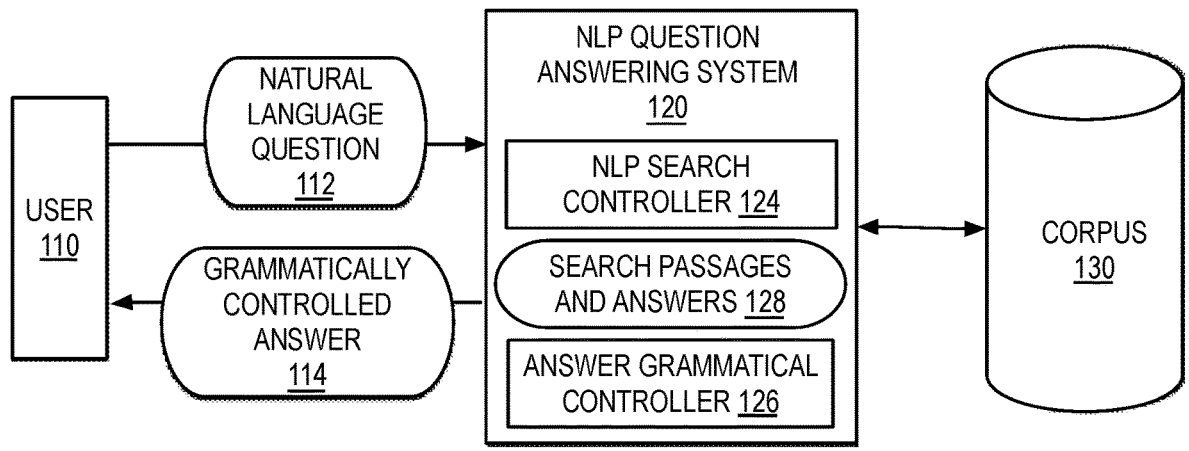
FIG. 1 illustrates one example of a block diagram of a natural language processing (NLP) answering system for efficient grammatical property alignment of an answer to a focus of an input question.

FIG. 1 illustrates one example of a block diagram of a natural language processing (NLP) answering system for efficient grammatical property alignment of an answer to a focus of an input question.

In one example, FIG. 1 illustrates a user 110 submitting a natural language question 112 to an NLP question answering system 120. In one example, NLP question answering system 120 represents a cognitive computing system that supports answering natural language question 112 through NLP techniques that facilitate the exchange of information with users who submit questions in a natural language. In one example, user 110 includes one or more of a human and an automated user.

In one example, natural language question 112 includes a string of text, which forms the basis of the elements of a query. In one example, natural language question 112 includes a string of text in a sentence structure associated with a question. In another example, natural language question 112 includes a string of text with elements that effectively present a question. In one example, the string of text in natural language question 112 represents a string of text elements in a natural human language format.

In the example illustrated, NLP question answering system 120 provides an automated mechanism that supports NLP based answering of questions about a subject matter based on information available in a corpus 130, including a volume of passages of data. For example, NLP question answering system 120 supports searching through large sets of sources of content in corpus 130 and analyzing the passages with regard to natural language question 112 to determine an answer to the question and a confidence measure as to how accurate an answer to the question may be.

In one example, machine learning plays a central role in artificial intelligence-based applications that interact with one or more NLP system, such as NLP question answering system 120. One of the primary outcomes of the process of creating and training a machine learning environment is a data object, referred to as a model, built from sample inputs. In one example, the one or more models in NLP question answering system 120 each represent a data object of a machine learning environment. According an advantage of the present invention, a data object in a machine learning environment machines automated natural language processing and text classification analysis of volumes of text in corpus 130 that are so large, such as millions of words and phrases, that a person attempting to analyze the same volumes of text would require years of work to reach a same conclusion that machine learning based data objects are capable of performing in increments of a second or less, and likely with a greater accuracy than could be performed by a person having to process the same volume of information.

For example, corpus 130 represents data, or a collection of data, used in linguistics and language progressing. In general, corpus 130 includes large volumes of data stored electronically. For example, corpus 130 may represent a collection of machine-readable texts that are representative of a variety of language, such as, but not limited to, newspaper articles, blogs, books, text of spoken speech, text from social media entries, and legal documents. In addition, each of natural language question 112 and corpus 130 may include structured and unstructured data. In one example, NLP question answering system 120 converts unstructured data in one or more of natural language question 112 and corpus 130 into structured data, through pre-defined data models or schema, with annotations and metadata that assist in identifying patterns and inferences. For example, NLP question answering system 120 may convert corpus 130 from unstructured data into structured data stored within a structure, such as a relational database, identified by searchable, predefined data models or schema, or other structures including annotations identified using a same specification. In one example, NLP question answering system 120 may apply one or more classifiers for annotating one or more of natural language question 112 and corpus 130.

In particular, in the example, NLP question answering system 120 includes an NLP search controller 124 that receives natural language question 112, searches corpus 130, selects one or more passages relevant to a focus of natural language question 112 from corpus 130, and generates one or more answers based on the selected passages, illustrated by search passages and answers 128. In one example, a question's focus represents the information expectations expressed by the question. For example, for natural language question 112 of "What is the minimum runway width for an auto-land approach for [plane A]?", NLP search controller 124 identifies a passage from corpus 130 relevant to the focus of a runway length of "the [plane A] needs at least a 145 foot runway" and extracts an answer of a direct text span from the passage of "145 foot" in search passages and answers 128.

In one example, NLP search controller 124 identifies passages, and then extracts answers from passages, based on semantic properties, rather than grammatical properties, such that an answer selected by NLP search controller 124 from a passage, in search passages and answers 128, initially matches a semantic intent of a question, but initially may not align with the grammatical properties of a focus of a question. In one example, a question's focus corresponds to a part of speech of the question, such as a noun of the question, that is likely to be present in the answer sentence. For example, the answer of "145 foot" from search passages and answers 128, in response to the question of "What is the minimum runway width for an auto-land approach for [plane A]?", meets the semantic properties of a "width" focus of question, but does not match the grammatical properties of the question's focus, which should use the plural form of "feet". If user 110 receives an answer to natural language question 112 that does not align with both the semantic and grammatical properties required of an answer to the question, user 110 may have lower confidence in the performance of NLP question answering system 120 and lower likelihood of adopting the answer than the likelihood if user 110 receives an answer to natural language question 112 that aligns with both the semantic and grammatical properties required of an answer to the question.

In the example, according to an advantage of the invention, NLP question answering system 120 implements an answer grammatical controller 126 for aligning an answer determined in search passages and answers 128 to the grammatical properties of the focus of natural language question 112. In the example, answer grammatical controller 126 analyzes the expected grammatical properties of a response to the focus of natural language question 112, modifies an answer in search passages and answers 128 to align with the expected grammatical properties of the focus, and returns the modified answer as grammatically controlled answer 114 to user 110. According to an advantage of the invention, by modifying an answer extracted from a passage of corpus 130 to align with the grammatical properties expected of an answer to the question, prior to returning the answer, NLP question answering system 120 not only improves the accuracy of the answer returned to user 110, but also improves the confidence that user 110 may have in the answer when the answer is returned in a correct grammatical form.

In addition, in one example, while NLP question answering system 120 may also provide a service that receives an input, such as natural language question 112, and grammatically aligns the words within natural language question 112 to also correct any grammatical errors within the question itself, according to an advantage of the invention, answer grammatical controller 126 also manages grammatical alignment between the focus of natural language question 112 and the answer generated to the question in grammatically controlled answer 114.

Figure 2:
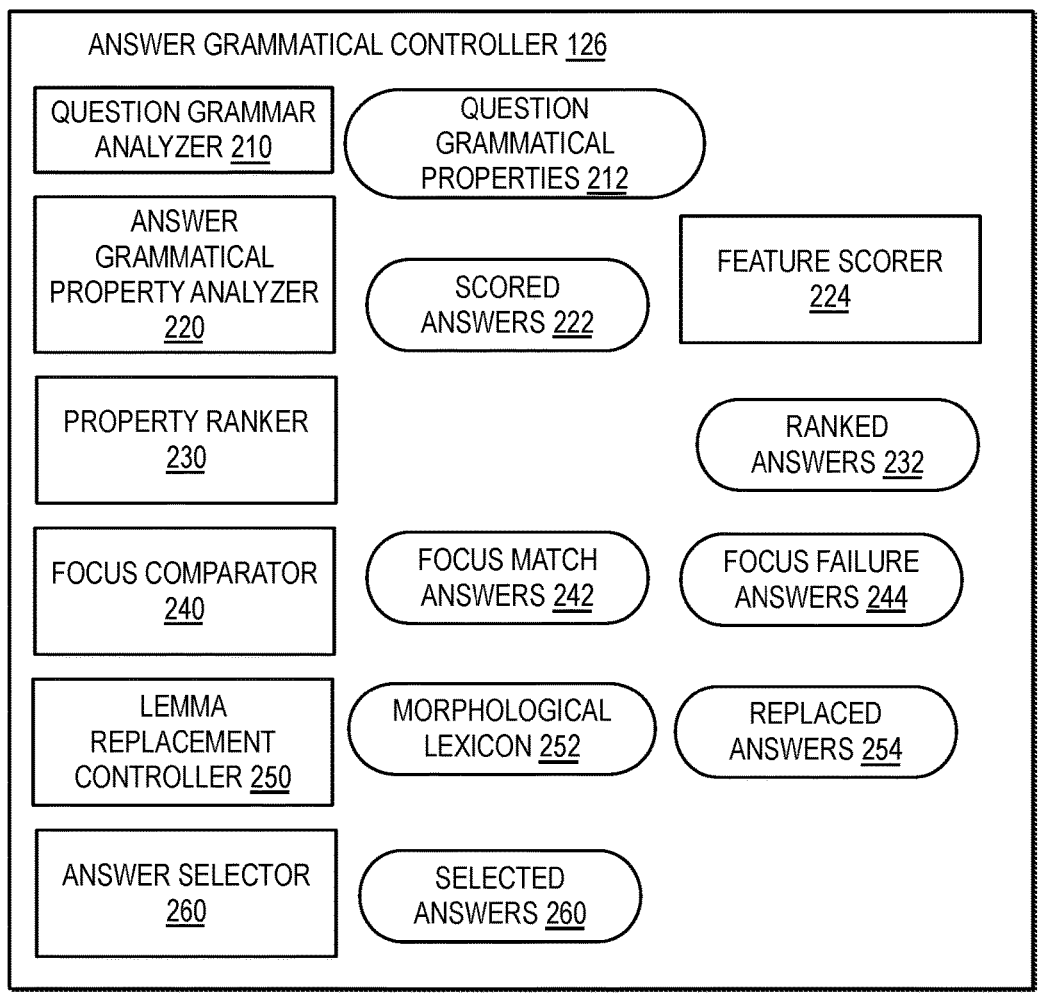
FIG. 2 illustrates one example of a block diagram of components of an answer grammatical controller of an NLP answering system.

FIG. 2 illustrates one example of a block diagram of components of an answer grammatical controller of an NLP answering system.

In one example, in response to answer grammatical controller 126 receiving natural language question 112, a question grammar analyzer 210 of answer grammatical controller 126 analyzes natural language question 112 to identify the grammatical properties of the question's focus, illustrated by question grammatical properties 212. In one example, question grammar analyzer 210 identifies relevant grammatical properties of the question's focus under one or more morphology categories. In one example, grammatical properties under one or more morphology categories may analyze the structure of words and parts of words and may also look at parts of speech, intonation, and stress, including the ways that context can change a word's pronunciation and meaning. In one example, question grammar analyzer 210 represents a classifier trained to identify multiple grammatical properties under one or more morphology categories in one or more languages. In another example, question grammar analyzer 210 represents multiple classifiers, each trained to identify a separate grammatical property under a particular morphology category of a particular language.

In one example, question grammar analyzer 210 identifies relevant grammatical properties for question grammatical properties 212 under an inflectional morphology category, including, but not limited to, identifying tense, mood, person, number, gender, aspect, comparison, case, and class. In one example, "tense" identifies a grammatical property of a verb inflected based on when an action occurred, "mood" identifies a grammatical property of a verb inflected to indicate whether a verb expresses a fact, command, question, wish, or conditionality. In one example, "person" identifies a grammatical property of a verb inflected based on the subject, such as adding "-s" for the third person in English. In one example, "number" identifies a grammatical property of a word based on the number, such as singular, plural, or dual. In one example, "gender" identifies a grammatical property of a word inflected based on a noun class. In one example, "aspect" identifies a grammatical property of a word inflected based on whether it is finished, such as by "-ing", "-ed", or "en" in English. In one example, "comparison" identifies a grammatical property of an adjective, depending on whether the adjective is positive, comparative, or superlative. In one example, "case" identifies a grammatical property of nouns marked according to roles, such as accusative, nominative, dative, and other roles, depending on the cases included in a particular language. In one example, "class" identifies a grammatical property of a word class, such as noun, verb, adjective and adverb, depending on the language.

In another example, question grammar analyzer 210 identifies relevant grammatical properties for question grammatical properties 212 under a derivational morphology category. In one example, a derivational morphology category may change the grammatical category or meaning of a word, such as "re-", "de-", "un-", "-an", "-ness", and "-ly". For example, a derivational morphology category may identify a grammatical property by identifying a derived country adjective, which may match to a country name, such as if a passage includes a country adjective, such as "American", a directed matching country name is "America".

Next, answer grammatical property analyzer 220 of answer grammatical controller 126 accesses search passages and answers 128, analyzes search passages and answers 128 to determine the grammatical properties of each answer, analyzes whether the grammatical properties of each answer match the grammatical properties of the question, and assigns a score to each answer to rank the answer based on a percentage of matching grammatical properties, as illustrated by scored answers 222. In one example, a feature scorer 224 is trained to score an answer based on the percentage of grammatical properties of the answer that match the grammatical properties of focus of the question. In one example, feature scorer 224 is trained to detect and score multiple matching grammatical properties. In another example, feature scorer 224 represents multiple individual grammatical property scorers, the scores of which are accumulated. In one example, the weights assigned to feature scorer 224 are learned as part of training answer ranking models applied by answer grammatical property analyzer 220 to determine and rank answers from search passages and answers 128. In particular, weights assigned to feature scorer 224 are applied by answer grammatical property analyzer 220 to rank an answer from search passages and answers 128 higher if there is a match between a selection of particular types or percentage of types of grammatical properties of the answer and the grammatical properties of the input question as identified in question grammatical properties 212.

Thereafter, a property ranker 230 of answer grammatical controller 126 sorts scored answers 222 to assess a selection of top scoring answers and designates the selection of top scoring answers as ranked answers 232. In one example, an entity supporting NLP questions answering system 120 may set a value N as a fixed value or a variable value, where property ranker 230 assesses a top N selection of top scoring answers as ranked answers 232, where N may represent all or a selection of the number of answers from scored answers 222. In one example, by assessing the top N scored answers from among scored answers 222, answer grammatical controller 126 focuses on the answers with most highly ranked grammatical properties that match the grammatical properties that user 110 may expect in a response to natural language question 112.

Next, a focus comparator 240 of answer grammatical controller 126 analyzes each answer in ranked answers 232 to determine focus match answers 242 and focus failure answers 244. In the example, focus comparator 240 analyzes whether the grammatical properties of each answer from ranked answers 232 match the grammatical properties of the focus of the question. If the grammatical properties of an answer match the grammatical properties of the focus of the question, focus comparator 240 places the answer in focus match answers 242. If the grammatical properties of an answer do not match the grammatical properties of the focus of the question, focus comparator 240 places the answer in focus failure answers 244.

In one example, focus comparator 240 analyzes whether the grammatical properties of each answer from ranked answers 232 matches the grammatical properties of the focus of the question based on the results of the same analysis previously performed by answer grammatical property analyzer 220, if the results of the analysis of which grammatical properties match are also stored with the scores stored in scored answers 222. In another example, focus comparator 240 analyzes whether the grammatical properties of each answer from ranked answers 232 matches the grammatical properties of the focus of the question by rerunning a same analysis performed by feature scorer 224 and determining whether any particular grammatical properties are scored as not matching by feature scorer 224. In another example, if a number of answers in search passages and answers 128 is small, then storing the initial results of feature scorer 224 with scored answers 222 may require minimal storage resources or rerunning the analysis by feature scorer 224 may require minimal processing resources. As a number of answers in search passages and answers 128 increases above a threshold, answer grammatical property analyzer 220 may dynamically adjust whether the particular property results of feature scorer 224 are stored in scored answers 222 or whether feature scorer 224 reanalyzes only a smaller selection of answers selected in ranked answers 232 to most efficiently mitigate use of storage resources or processing resources required by focus comparator 240.

In the example, if an answer is placed in focus failure answers 244, a lemma replacement controller 250 of answer grammatical controller 126 applies a lemmatization analysis to the answer to identify the lemma of the head word in the answer. In one example, lemmatization refers to a vocabulary and morphological analysis of a word to return to the base or dictionary form of the word, which is referred to as the lemma. In one example, lemmatization may aim to remove an inflectional ending to return to a base or dictionary form of a word. Lemmatization may also incorporate stemming or other types of analysis that reduce inflectional forms and derivatives related forms to a common base form, which may vary based on the language to which the analysis applies. For example, lemma replacement controller 250 may apply a Porter Stemmer lemmatization analysis for identifying a lemma of a head word in an answer in English. In another example, lemma replacement controller 250 may apply a more complex lemmatization analysis for more morphologically complex languages, such as a lookup table from surface forms to root forms.

In addition, lemma replacement controller 250 consults a morphological lexicon 252 to identify a surface form of the identified lemma that matches the grammatical properties of the question. For example, morphological lexicon 252 may include a lookup table from root forms to surface forms based on morphological paradigms keyed on selected grammatical properties. Morphological lexicon 252 includes multiple types of lookup aligners such as, but not limited to, a number aligner for aligning singular, dual, and plural entries, a case aligner for aligning nominative and accusative entries, a word class aligner for aligning parts of speech, and other stored morphological paradigms for transformation lookups. In one example, for a root form of "foot" in the lookup table, the singular entry is "foot" and the plural entry is "feet." In another example, for a root form of "America" in the lookup table, the adjective entry is "American" and the noun entry is "America".

In the example, lemma replacement controller 250 replaces the non-matching answer with the identified surface form in replaced answers 254. In the example, by lemma replacement controller 250 processing answers using morphological lexicon 252, answer grammatical controller 126 modifies answers to match the grammatically properties of the question, rather than the grammatical properties of the text from the passages retrieved from corpus 130. For example, if natural language question 112 is "What countries include English-speaking schools?" and ranked answers 232 includes a passage of "Many American students speak English", then a user may expect that the answer to natural language question 112 of "America", as a noun which reflects the focus of the question of "country", rather than an adjective of "American", which reflects a person. In the example, morphological lexicon 252 may include a lookup table to replace "Americans" by "America" in replaced answers 254.

Next, an answer selector 260 of answer grammatical controller 126 organizes found match answers 242 and replaced answers 254 as selected answers 260. In the example, answer grammatical controller 126 returns selected answers 260 to user 110 as grammatically controller answer 124.

In the example, while answer selector 260 focuses on returning an answer to a question, answer selector 260 may also return pointers to the documents including passages from which an answer is retrieved. In the example, even when selected answers 260 includes replaced answers 254, answer selector 260 maintains a connection between the replaced generated answers and the original passage, such that if user 110 selects the pointer to access to the passage that serves as the base for a replaced answer, NLP question answering system 120 returns the original passage without the replaced text. In addition, in one example, while NLP question answering system 120 may also provide a service that, upon a user selection to review the original passage from which grammatically controller answer 114 is accessed, detects incorrect grammatical alignment to other words within the text of the original passage and provides a service for grammatically correcting words within the passage itself, according to an advantage of the invention, answer grammatical controller 126 first manages grammatical alignment between the focus of natural language question 112 and the answer generated in grammatically controlled answer 114, independent of whether the text of the original passage is grammatically consistent within the text itself.

Figure 3:
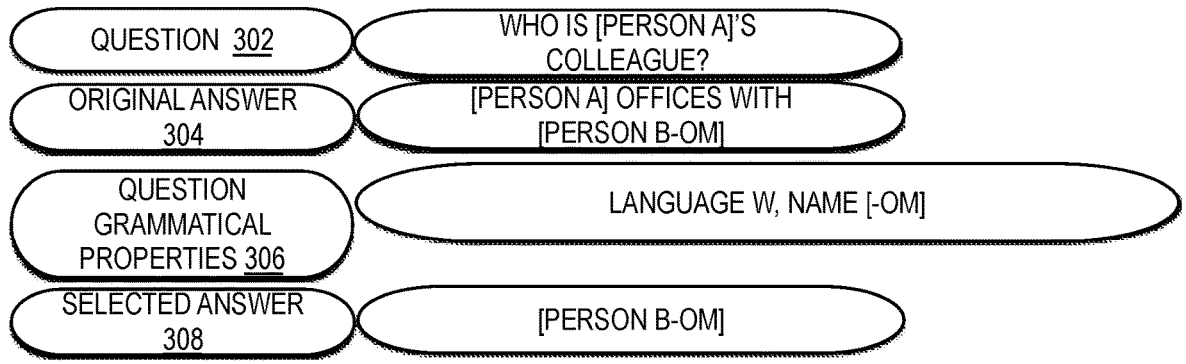
FIG. 3 illustrates one example of a block diagram of a grammatical property alignment by an answer grammatical controller of an NLP question answering system of a question from the grammatical properties of a language in which the question is posed to the grammatical properties of a language in which the answer is retrieved.
Figure 3:
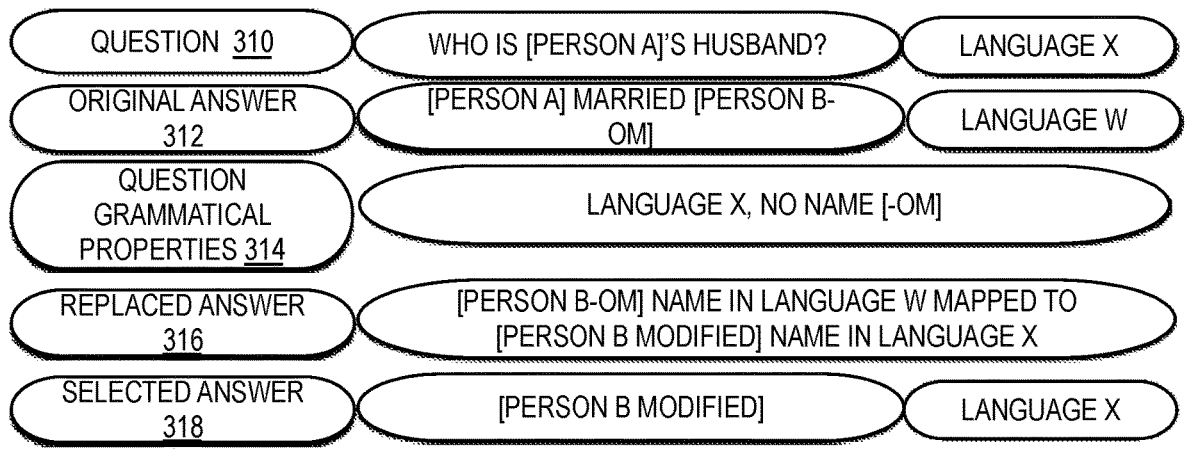

FIG. 3 illustrates a block diagram of one example of a grammatical property alignment by an answer grammatical controller of an NLP question answering system of a question from the grammatical properties of a language in which the question is posed to the grammatical properties of a language in which the answer is retrieved.

In the example, a same question of "Who is [person A]'s colleague?" is submitted in two different queries, with each query in a different language and with "person A" representing a name of a person. For example, the text of a question 302 of "Who is [person A]'s colleague?" is submitted in "language W" and the text of a question 310 of "Who is [person A]'s colleague?" is submitted in "language X". In the example, as illustrated in original answer 304 and original answer 312, NLP search controller 124 retrieves a same answer of "[person A] offices with [person B-OM]" in "language W" for both question 302 and question 310. In one example, the "-OM" suffix identified at the end of the name of "person B" may represent a grammatical property of names in one language, such as "language W", but not represented in another language, such as "language X".

In the example, for question 302 posed in "language W", question grammatical properties 306 identified by question grammar analyzer 210 include grammatical properties for "language W" of names with an "-OM", matching the grammatical properties of original answer 304, and no other grammatical property differences are detected between the grammatical properties of question 302 and the grammatical properties of original answer 304. As a result, answer grammatical controller 126 outputs a selected answer 308 in response to question 302 of "[person B-OM]", which is the same text as in original answer 304.

In the example, for question 310 posed in "language X", question grammatical properties 314 for "language X" do not match all the identified grammatical properties of original answer 312. In the example, the name "[person B-OM]" in original answer 312 does not match question grammatical properties 314 of "language X" not including "-OM" as a name suffix. In the example, in response to answer grammatical controller 126 detecting grammatical properties that do not match between the question and answer, answer grammatical controller 126 determines a replaced answer 316 by replacing the "[person B-OM]" name in "language W" by mapping to a "person B modified" name in "language X". As a result, answer grammatical controller 126 outputs a selected answer 318 in response to question 310 of "[person B modified]", which matches the grammatical morphology of question 310.

Figure 4:
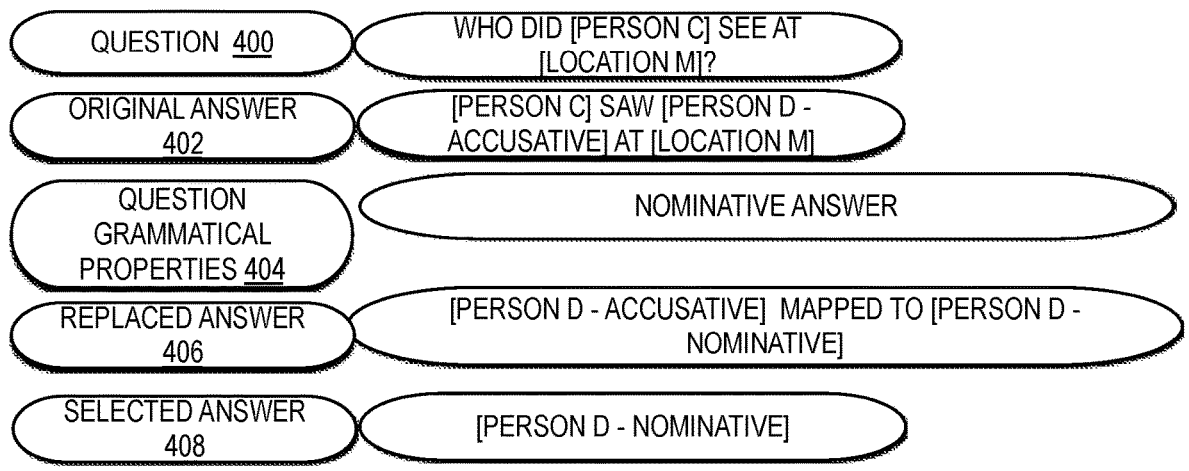
FIG. 4 illustrates one example of a block diagram of a grammatical property alignment by an answer grammatical controller of an NLP question answering system of a question in a language in which the question is posed having a focus with a nominative grammatical property and the original answer is provided with an accusative grammatical property.

FIG. 4 illustrates a block diagram of an example of a grammatical property alignment by an answer grammatical controller of an NLP question answering system of a question in a language in which the question is posed having a focus with a nominative grammatical property and the original answer is provided with an accusative grammatical property.

In the example, a question of "Who is [person C] see at [location M]?" is submitted in a question 400, with "person C" representing a name of a person and "location M" representing a name of a location. In the example, as illustrated in original answer 402, NLP search controller 124 retrieves an answer of "[person C] saw [person D-accusative] at [location M]". In one example, the "accusative" property identified with "person C" may represent a grammatical property of names in the language in which the answer is retrieved, where a name may be represented by an accusative case or a nominative case. In one example, an accusative case is a case that contains the direct object of a sentence and a nominative case is a case that contains the subject of a sentence. In one example, there may be accusative pronouns with a name associated with an associative case and nominative pronouns with a name associated with a nominative case.

In the example, question grammar analyzer 210 identifies question grammatical properties 404 for question 400 of a "nominative answer". "Person D-accusative" of original answer 402 does not match the identified question grammatical properties 404 of "nominative answer," of original answer 402. In the example, in response to answer grammatical controller 126 detecting grammatical properties that do not match between the question and answer, answer grammatical controller 126 determines a replaced answer 406 by replacing the "[person D-accusative]" by mapping to a "person D nominative" name. As a result, answer grammatical controller 126 outputs a selected answer 408 in response to question 400 of "[person D-nominative]", which matches the grammatical morphology of question 400.

Figure 5:
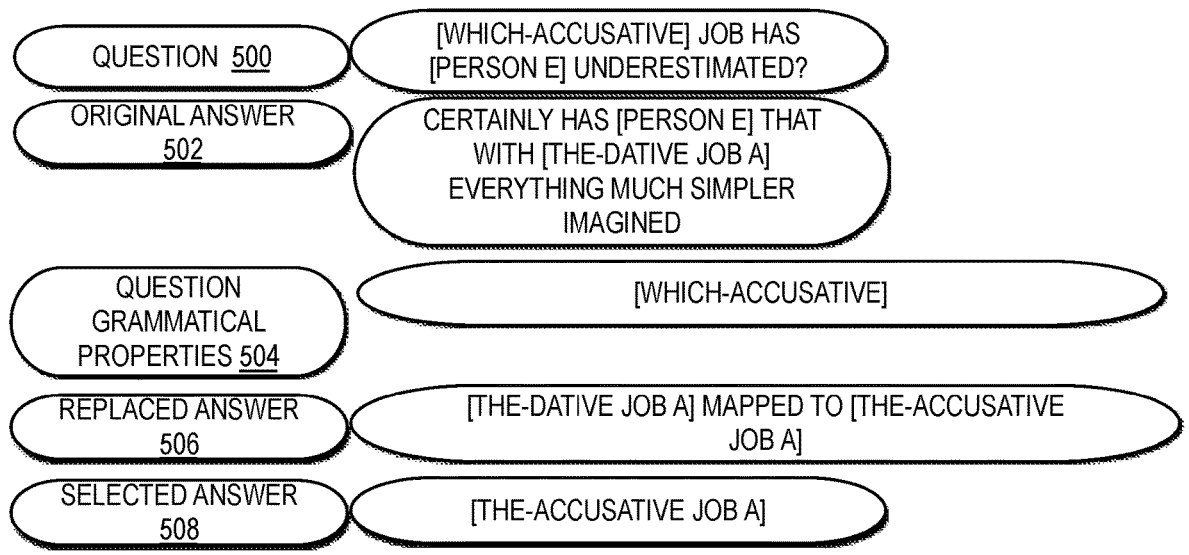
FIG. 5 illustrates one example of a block diagram of a grammatical property alignment by an answer grammatical controller of an NLP question answering system of a question in a language in which the question is posed having a focus with an accusative grammatical property and the original answer is provided with a dative grammatical property.

FIG. 5 illustrates a block diagram of an example of a grammatical property alignment by an answer grammatical controller of an NLP question answering system of a question in a language in which the question is posed having a focus with an accusative grammatical property and the original answer is provided with a dative grammatical property.

In the example, a question of "[which-accusative] job has [person E] underestimated?" is submitted in a question 500, with "person E" representing a name of a person and "[which-accusative] job" representing a question about a job written in an accusative case. In the example, as illustrated in original answer 502, NLP search controller 124 retrieves an answer of "certainly has [person E] that with [the-dative job A] everything much simpler imagined". In one example, the "dative" property identified with "job A" may represent a grammatical property of names in the language in which the answer is retrieved in, where a name may be represented by an accusative, nominative, or dative case. In one example, an accusative case is a case that contains the direct object of a sentence, a nominative case is a case that contains the subject of a sentence, and a dative case is for the indirect object of a sentence. In one example, each case may include specific parts of speech to represent a same subject or object, to reflect the case.

In the example, question grammar analyzer 210 identifies question grammatical properties 504 for question 500 of "[which-accusative]". The "[the-dative job A]" of original answer 502 does not match the identified question grammatical properties 504 of "[which-accusative]" of original answer 502. In the example, in response to answer grammatical controller 126 detecting grammatical properties that do not match between the question and answer, answer grammatical controller 126 determines a replaced answer 506 by replacing the "[the-dative job A]" by mapping to a "[the-accusative job A]". As a result, answer grammatical controller 126 outputs a selected answer 508 in response to question 500 of "[the-accusative job A]", which matches the grammatical morphology of question 500.

Figure 6:
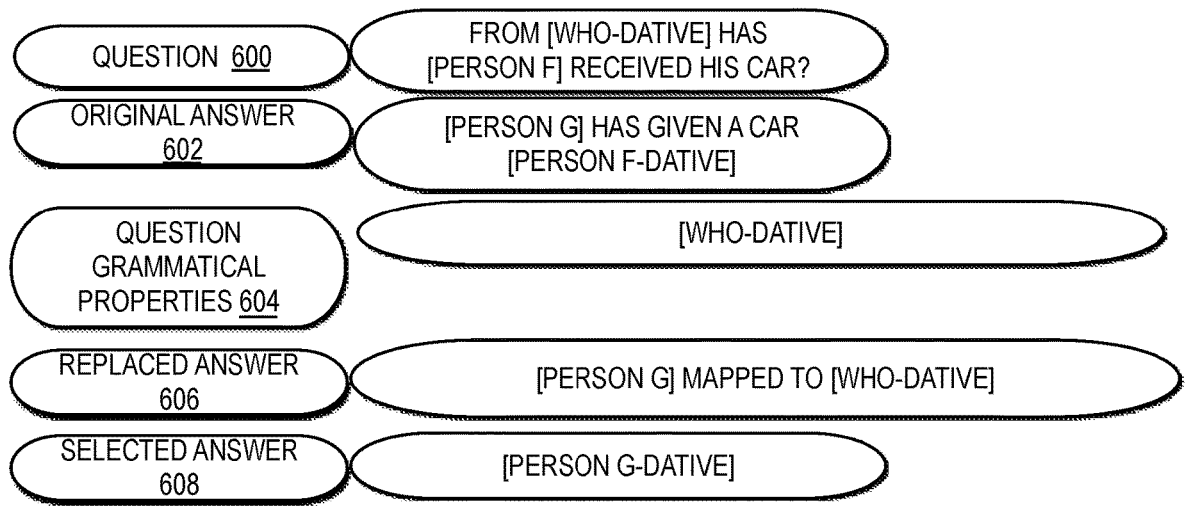
FIG. 6 illustrates one example of a block diagram of an example of a grammatical property alignment by an answer grammatical controller of an NLP question answering system of a question in a language in which the question is posed having a focus with a dative and pst grammatical property and the original answer is provided with a pst and dative grammatical property.

FIG. 6 illustrates a block diagram of an example of a grammatical property alignment by an answer grammatical controller of an NLP question answering system of a question in a language in which the question is posed having a focus with a dative grammatical property and the original answer is provided with a dative grammatical property.

In the example, a question of "from [who-dative] has [person F] received his car?" is submitted in a question 600. In the example, as illustrated in original answer 602, NLP search controller 124 retrieves an answer of "[person G] has given a car [person F-dative]" in the language in which the answer is retrieved in.

In the example, question grammar analyzer 210 identifies question grammatical properties 604 for question 600 of "[who-dative]". The "[person G]" of original answer 602 does not match the identified question grammatical properties 604 of "[who-dative]" of original answer 602. In the example, in response to answer grammatical controller 126 detecting grammatical properties that do not match between the question and answer, answer grammatical controller 126 determines a replaced answer 606 by replacing the "[person G]" by mapping to a "[who-dative]". As a result, answer grammatical controller 126 outputs a selected answer 608 in response to question 600 of "[person G-dative]", which matches the grammatical morphology of question 600.

Figure 7:
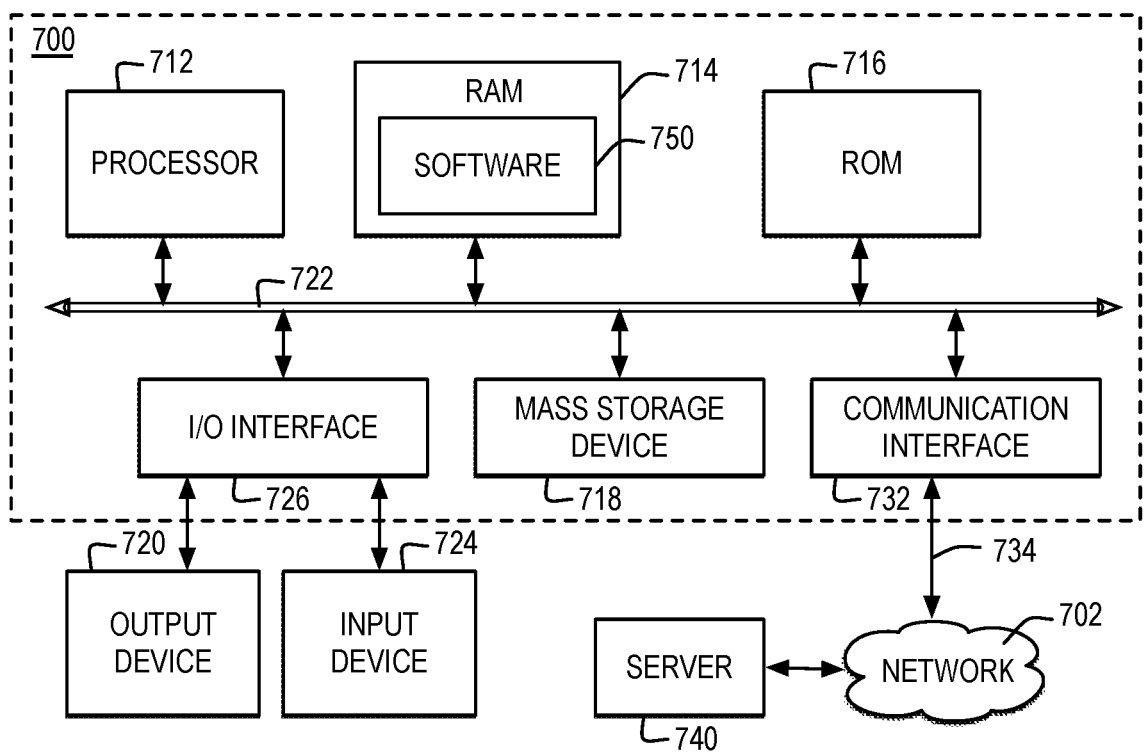
FIG. 7 illustrates one example of a computer system in which one embodiment of the invention may be implemented.

FIG. 7 illustrates a block diagram of one example of a computer system in which one embodiment of the invention may be implemented. The present invention may be performed in a variety of systems and combinations of systems, made up of functional components, such as the functional components described with reference to a computer system 700 and may be communicatively connected to a network, such as network 702.

Computer system 700 includes a bus 722 or other communication device for communicating information within computer system 700, and at least one hardware processing device, such as processor 712, coupled to bus 722 for processing information. Bus 722 preferably includes low-latency and higher latency paths that are connected by bridges and adapters and controlled within computer system 700 by multiple bus controllers. When implemented as a server or node, computer system 700 may include multiple processors designed to improve network servicing power.

Processor 712 may be at least one general-purpose processor that, during normal operation, processes data under the control of software 750, which may include at least one of application software, an operating system, middleware, and other code and computer executable programs accessible from a dynamic storage device such as random access memory (RAM) 714, a static storage device such as Read Only Memory (ROM) 716, a data storage device, such as mass storage device 718, or other data storage medium. Software 750 may include, but is not limited to, code, applications, protocols, interfaces, and processes for controlling one or more systems within a network including, but not limited to, an adapter, a switch, a server, a cluster system, and a grid environment.

Computer system 700 may communicate with a remote computer, such as server 740, or a remote client. In one example, server 740 may be connected to computer system 700 through any type of network, such as network 702, through a communication interface, such as network interface 732, or over a network link that may be connected, for example, to network 702.

In the example, multiple systems within a network environment may be communicatively connected via network 702, which is the medium used to provide communications links between various devices and computer systems communicatively connected. Network 702 may include permanent connections such as wire or fiber optics cables and temporary connections made through telephone connections and wireless transmission connections, for example, and may include routers, switches, gateways and other hardware to enable a communication channel between the systems connected via network 702. Network 702 may represent one or more of packet-switching based networks, telephony-based networks, broadcast television networks, local area and wire area networks, public networks, and restricted networks.

Network 702 and the systems communicatively connected to computer 700 via network 702 may implement one or more layers of one or more types of network protocol stacks which may include one or more of a physical layer, a link layer, a network layer, a transport layer, a presentation layer, and an application layer. For example, network 702 may implement one or more of the Transmission Control Protocol/Internet Protocol (TCP/IP) protocol stack or an Open Systems Interconnection (OSI) protocol stack. In addition, for example, network 702 may represent the worldwide collection of networks and gateways that use the TCP/IP suite of protocols to communicate with one another. Network 702 may implement a secure HTTP protocol layer or other security protocol for securing communications between systems.

In the example, network interface 732 includes an adapter 734 for connecting computer system 700 to network 702 through a link and for communicatively connecting computer system 700 to server 740 or other computing systems via network 702. Although not depicted, network interface 732 may include additional software, such as device drivers, additional hardware and other controllers that enable communication. When implemented as a server, computer system 700 may include multiple communication interfaces accessible via multiple peripheral component interconnect (PCI) bus bridges connected to an input/output controller, for example. In this manner, computer system 700 allows connections to multiple clients via multiple separate ports and each port may also support multiple connections to multiple clients.

Figure 8:
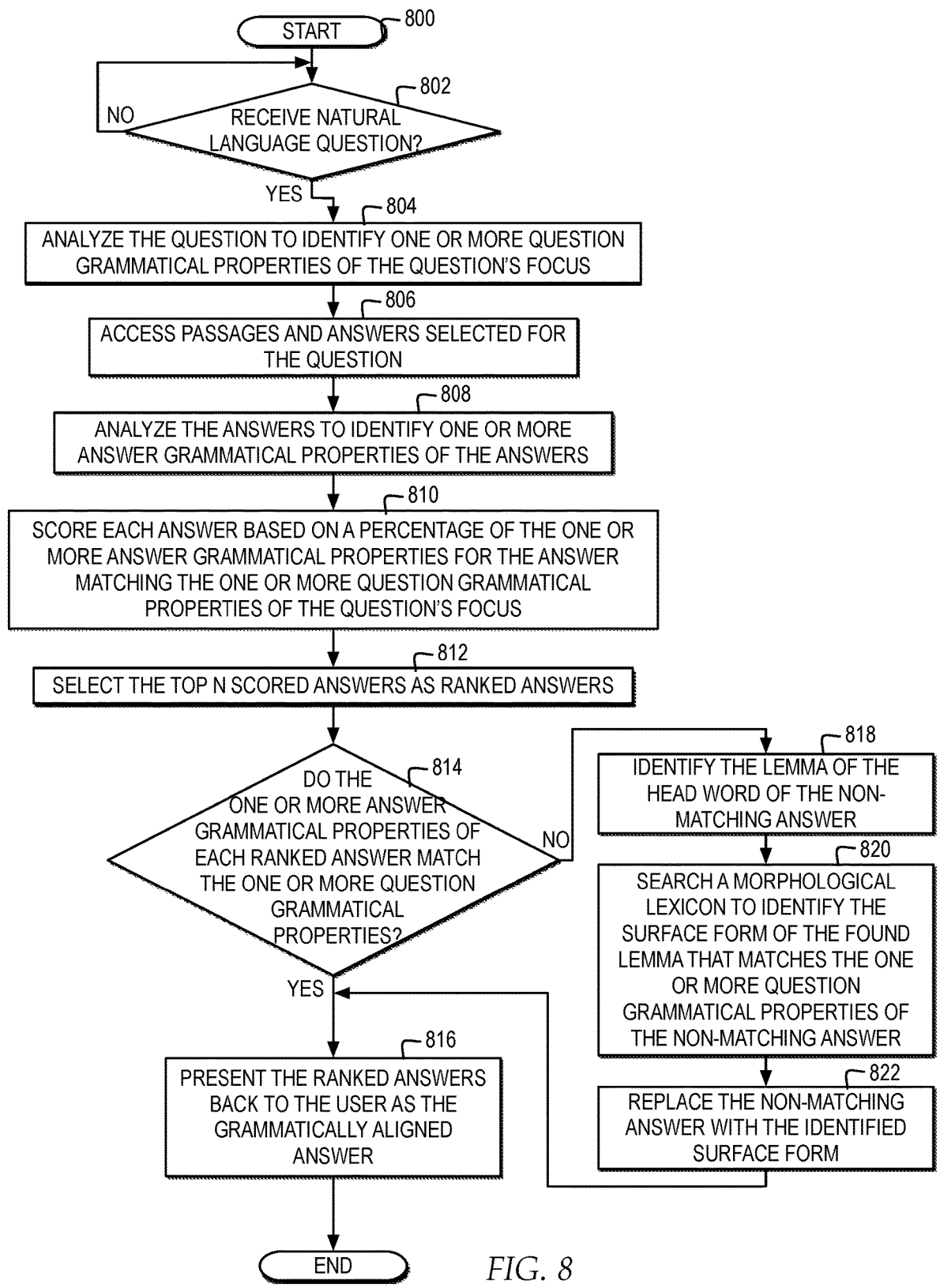
FIG. 8 illustrates a high-level logic flowchart of a process and computer program for efficiently managing grammatical alignment of an answer to a focus of a question by a question answering system.

In one embodiment, the operations performed by processor 712 may control the operations of flowchart of FIG. 8 and other operations described herein. Operations performed by processor 712 may be requested by software 750 or other code or the steps of one embodiment of the invention might be performed by specific hardware components that contain hardwired logic for performing the steps, or by any combination of programmed computer components and custom hardware components. In one embodiment, one or more components of computer system 700, or other components, which may be integrated into one or more components of computer system 700, may contain hardwired logic for performing the operations of flowchart in FIG. 8.

In addition, computer system 700 may include multiple peripheral components that facilitate input and output. These peripheral components are connected to multiple controllers, adapters, and expansion slots, such as input/output (I/O) interface 726, coupled to one of the multiple levels of bus 722. For example, input device 724 may include, for example, a microphone, a video capture device, an image scanning system, a keyboard, a mouse, or other input peripheral device, communicatively enabled on bus 722 via I/O interface 726 controlling inputs. In addition, for example, output device 720 communicatively enabled on bus 722 via I/O interface 726 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 7, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 7 may vary. Furthermore, those of ordinary skill in the art will appreciate that the depicted example is not meant to imply architectural limitations with respect to the present invention.

FIG. 8 illustrates a high-level logic flowchart of a process and computer program for efficiently managing grammatical alignment of an answer to a focus of a question by a question answering system.

In one example, the process and computer program start at block 800 and thereafter proceed to block 802. Block 802 illustrates a determination whether a natural language question is received. At block 802, if a natural language question is received, then the process passes to block 804. Block 804 illustrates analyzing the question to identify one or more question grammatical properties of the question's focus. Next, block 806 illustrates accessing passages and answers selected for the question, such as from the NLP search controller. Thereafter, block 808 illustrates analyzing the answers to identify one or more answer grammatical properties of the answers. Next, block 810 illustrates scoring each answer based on a percentage of the one or more answer grammatical properties for the answer matching the one or more question grammatical properties of the question's focus. Thereafter, block 812 illustrates selecting the top N scored answers as the ranked answers, and the process passes to block 814.

Block 814 illustrates a determination whether the one or more answer grammatical properties of each ranked answer match the one or more question grammatical properties. At block 814, if the one or more answer grammatical properties of each ranked answer match the one or more question grammatical properties, then the process passes to block 816. Block 816 illustrates presenting the ranked answers back to the user as the grammatically aligned answer, and the process ends.

Returning to block 814, at block 814, if the one or more answer grammatical properties of each ranked answer do not match the one or more question grammatical properties, then the process passes to block 818. Block 818 illustrates identifying the lemma of the head word of the non-matching answer. Next, block 820 illustrates searching a morphological lexicon to identify the surface form of the found lemma that matches the one or more question grammatical properties of the non-matching answer. Thereafter, block 822 illustrates replacing the non-matching answer with the identified surface form, and the process passes to block 816.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method comprising:
   in response to receiving a question in a natural language format, identifying, by a computer, one or more selected passages from a corpus that are relevant to a focus of the question from among a plurality of passages in the corpus;
   aligning, by the computer, one or more answer grammatical properties of one or more answers, selected from the one or more selected passages, to one or more question grammatical properties of the focus of the question, wherein aligning the one or more answer grammatical properties comprises:
     evaluating, by the computer, whether one or more respective answer grammatical properties of a respective answer from among the one or more answers match one or more grammatical properties of the focus; in response to the one or more respective answer grammatical properties of the respective answer not matching the one or more grammatical properties of the focus, replacing, by the computer, the respective answer with a replacement answer matching the one or more question grammatical properties; and
     in response to replacing the respective answer with the replacement answer, identifying, by the computer, the replacement answer as aligned; and
   returning, by the computer, the one or more answers in response to the question.

2. The method of claim 1, wherein identifying the one or more selected passages from the corpus that are relevant to the focus of the question from among the plurality of passages in the corpus further comprises:
   parsing, by the computer, the question to determine the focus of the question and the one or more question grammatical properties of the focus of the question; and
   searching, by the computer, the corpus with one or more search terms from the question to identify the one or more selected passages relevant to the question from the plurality of passages in the corpus.

3. The method according to claim 1, wherein aligning the one or more answer grammatical properties of the one or more answers, selected from the one or more selected passages, to the one or more question grammatical properties of the focus of the question further comprises:
   analyzing, by the computer, the one or more answers to identify the one or more answer grammatical properties of each of the one or more answers.

4. The method according to claim 1, wherein aligning the one or more answer grammatical properties of the one or more answers, selected from the one or more selected passages, to the one or more question grammatical properties of the focus of the question further comprises:
   scoring, by the computer, each of one or more possible answers selected from the one or more selected passages based on a percentage of the respective answer grammatical properties matching the one or more question grammatical properties of the focus;
   ranking, by the computer, each of the one or more possible answers based on a respective score assigned to each of the one or more possible answers; and
   selecting, by the computer, a top selection of the one or more possible answers ranked with a highest score as the one or more answers.

5. The method according to claim 1, wherein aligning the one or more answer grammatical properties of the one or more answers, selected from the one or more selected passages, to the one or more question grammatical properties of the focus of the question further comprises:
   in response to the one or more respective answer grammatical properties of the respective answer matching the one or more question grammatical properties of the focus, identifying, by the computer, the respective answer as aligned.

6. The method according to claim 1, wherein replacing the respective answer with the replacement answer matching the one or more question grammatical properties further comprises:

identifying, by the computer, a lemma of a head word of the respective answer in the one or more respective answer grammatical properties;

applying, by the computer, a morphological lexicon to identify a surface form of the lemma that matches the one or more question grammatical properties; and replacing, by the computer, the respective answer with the surface form.

7. The method according to claim 6, wherein applying the morphological lexicon to identify the surface form of the lemma that matches the one or more question grammatical properties further comprises:

applying, by the computer, the morphological lexicon comprising a plurality of lookup tables for converting a plurality of lemmas between a plurality of grammatical properties under a plurality of morphology categories in a plurality of languages.

8. The method according to claim 6, wherein applying the morphological lexicon to identify the surface form of the lemma that matches the one or more question grammatical properties further comprises:

applying, by the computer, the morphological lexicon to removing an inflectional form of the lemma to identify the surface form.

9. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:

program instructions, in response to receiving a question in a natural language format, to identify one or more selected passages from a corpus that are relevant to a focus of the question from among a plurality of passages in the corpus;

program instructions to align one or more answer grammatical properties of one or more answers, selected from the one or more selected passages, to one or more question grammatical properties of the focus of the question, wherein aligning the one or more answer grammatical properties comprises:

program instructions to evaluate whether one or more respective answer grammatical properties of a respective answer from among the one or more answers match one or more grammatical properties of the focus; in response to the one or more respective answer grammatical properties of the respective answer not matching the one or more grammatical properties of the focus, to replace the respective answer with a replacement answer matching the one or more question grammatical properties; and program instructions, in response to replacing the respective answer with the replacement answer, to identify the replacement answer as aligned; and program instructions to return the one or more answers in response to the question.

10. The computer system according to claim 9, wherein identifying the one or more selected passages from the corpus that are relevant to the focus of the question from among the plurality of passages in the corpus further comprises:

program instructions to parse the question received in the natural language format to determine the focus and the one or more question grammatical properties of the focus; and program instructions to search the corpus with one or more search terms from the question to identify the one or more selected passages relevant to the question from the plurality of passages in the corpus.

11. The computer system according to claim 9, wherein aligning the one or more answer grammatical properties of the one or more answers, selected from the one or more selected passages, to the one or more question grammatical properties of the focus of the question further comprises:

program instructions to analyze the one or more answers to identify the one or more answer grammatical properties of each of the one or more answers.

12. The computer system according to claim 9, aligning the one or more answer grammatical properties of the one or more answers, selected from the one or more selected passages, to the one or more question grammatical properties of the focus of the question further comprises:

program instructions to score each of one or more possible answers selected from the one or more selected passages based on a percentage of the respective answer grammatical properties matching the one or more question grammatical properties of the focus;

program instructions to rank each of the one or more possible answers based on a respective score assigned to each of the one or more possible answers; and program instructions to select a top selection of the one or more possible answers ranked with a highest score as the one or more answers.

13. The computer system according to claim 9, program instructions further comprising:

program instructions, in response to the one or more respective answer grammatical properties of the respective answer matching the one or more question grammatical properties of the focus, to identify the respective answer as aligned.

14. The computer system according to claim 9, wherein replacing the respective answer with the replacement answer matching the one or more question grammatical properties further comprises:

program instructions to identify a lemma of a head word of the respective answer in the one or more respective answer grammatical properties;

program instructions to apply a morphological lexicon to identify a surface form of the lemma that matches the one or more question grammatical properties; and program instructions to replace the respective answer with the surface form.

15. The computer system according to claim 14, wherein applying the morphological lexicon to identify the surface form of the lemma that matches the one or more question grammatical properties further comprises:

program instructions to apply the morphological lexicon comprising a plurality of lookup tables for converting a plurality of lemmas between a plurality of grammatical properties under a plurality of morphology categories in a plurality of languages.

16. The computer system according to claim 14, wherein applying the morphological lexicon to identify the surface form of the lemma that matches the one or more question grammatical properties further comprises:

program instructions to apply the morphological lexicon to removing an inflectional form of the lemma to identify the surface form.

17. A computer program product comprises a computer readable storage medium having program instructions embodied therewith, wherein the computer readable storage medium is not a transitory signal per se, the program instructions executable by a computer to cause the computer to:
- in response to receiving a question in a natural language format, identify, by a computer, one or more selected passages from a corpus that are relevant to a focus of the question from among a plurality of passages in the corpus;
- align, by the computer, one or more answer grammatical properties of one or more answers, selected from the one or more selected passages, to one or more question grammatical properties of the focus of the question, wherein aligning the one or more answer grammatical properties comprises:
  - evaluate, by the computer, whether one or more respective answer grammatical properties of a respective answer from among the one or more answers match one or more grammatical properties of the focus; in response to the one or more respective answer grammatical properties of the respective answer not matching the one or more grammatical properties of the focus, replace, by the computer, the respective answer with a replacement answer matching the one or more question grammatical properties; and
  - in response to replacing the respective answer with the replacement answer, identify, by the computer, the replacement answer as aligned; and
- return, by the computer, the one or more answers in response to the question.

18. The computer program product according to claim 17, wherein identifying the one or more selected passages from the corpus that are relevant to the focus of the question from among the plurality of passages in the corpus further comprises the program instructions executable by the computer to cause the computer to:
- parse, by the computer, the question received in the natural language format to determine the focus and the one or more question grammatical properties of the focus; and
- search, by the computer, the corpus with one or more search terms from the question to identify the one or more selected passages relevant to the question from the plurality of passages in the corpus.

19. The computer program product according to claim 17, wherein aligning the one or more answer grammatical properties of the one or more answers, selected from the one or more selected passages, to the one or more question grammatical properties of the focus of the question further comprising the program instructions executable by the computer to cause the computer to:
- analyze, by the computer, the one or more answers to identify the one or more answer grammatical properties of each of the one or more answers.

20. The computer program product according to claim 17, wherein aligning the one or more answer grammatical properties of the one or more answers, selected from the one or more selected passages, to the one or more question grammatical properties of the focus of the question further comprising the program instructions executable by the computer to cause the computer to:
- score, by the computer, each of one or more possible answers selected from the one or more selected passages based on a percentage of the respective answer grammatical properties matching the one or more question grammatical properties of the focus;
- rank, by the computer, each of the one or more possible answers based on a respective score assigned to each of the one or more possible answers; and
- select, by the computer, a top selection of the one or more possible answers ranked with a highest score as the one or more answers.

* * * * *